(12) United States Patent
Levy-Kendler

(10) Patent No.: US 6,345,363 B1
(45) Date of Patent: *Feb. 5, 2002

(54) MICROPROCESSOR CORE POWER REDUCTION BY NOT RELOADING EXISTING OPERANDS

(75) Inventor: Limor Levy-Kendler, Kadima (IL)

(73) Assignee: National Semiconductor Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/102,690

(22) Filed: Jun. 23, 1998

(51) Int. Cl.[7] ............................................. G06F 1/32
(52) U.S. Cl. ................................... 713/320; 712/33
(58) Field of Search .................... 712/33, 11; 713/300, 713/320, 322, 323, 324, 330, 340

(56) References Cited

U.S. PATENT DOCUMENTS

| | | | |
|---|---|---|---|
| 4,870,570 A | 9/1989 | Satoh et al. ................. | 364/200 |
| 4,893,271 A | 1/1990 | Davis et al. ................. | 364/900 |
| 5,025,387 A | 6/1991 | Frane ........................... | 364/493 |
| 5,036,456 A | 7/1991 | Koegel ......................... | 364/200 |
| 5,218,704 A | 6/1993 | Watts, Jr. et al. ........... | 395/750 |
| 5,369,771 A | 11/1994 | Gettel ........................... | 395/750 |
| 5,390,350 A | 2/1995 | Chung et al. ................ | 395/150 |
| 5,392,023 A | 2/1995 | D'Avello et al. ............ | 358/400 |
| 5,396,635 A | 3/1995 | Fung ............................. | 395/800 |
| 5,408,668 A | 4/1995 | Tornai .......................... | 395/750 |
| 5,418,969 A | 5/1995 | Matsuzaki et al. .......... | 395/750 |
| 5,428,790 A | 6/1995 | Harper et al. ................ | 395/750 |
| 5,485,116 A | 1/1996 | Cserveny et al. ........... | 327/537 |
| 5,511,203 A | 4/1996 | Wisor et al. ................. | 395/750 |
| 5,513,175 A | 4/1996 | Ichii et al. .................... | 370/17 |
| 5,692,202 A | 11/1997 | Kardach et al. ............. | 395/750 |
| 5,880,981 A * | 3/1999 | Kojima et al. ............... | 708/523 |
| 6,092,094 A * | 7/2000 | Ireton ........................... | 708/706 |

OTHER PUBLICATIONS

National Semiconductor, CR32A Programmer's Reference manual, Feb. 97, pp. 5–1, 5–2, 5–20–5–21, 5–32–5–33.*

Case, Brian "Piranha Family Will Scale From Eight To Sixty–Four Bits", 1994 MicroDesign Resources; vol. 8, Nov. 15, Nov. 14, 1994; pp. 1 –4.

* cited by examiner

Primary Examiner—John F. Niebling
Assistant Examiner—Stacy Whitmore
(74) Attorney, Agent, or Firm—Pillsbury Winthrop LLP

(57) ABSTRACT

An apparatus for and method of reducing the power consumed by a microprocessor core are disclosed. The apparatus and method reduce power by not loading operands into the core's data-path when they are already there. The apparatus has a core circuit for implementing a microprocessor core, the core circuit including at least one data bus, a plurality of operand storage circuits, at least one operating circuit, and a control circuit. The data buses are configured to transmit a plurality of operands. The operand storage circuits are connected to the data buses, are configured to receive a plurality of load commands and in accordance therewith to load the operands, and are configured to output the operands. The operating circuits are connected to the operand storage circuits and are configured to receive the operands and in accordance therewith to generate a result signal. The control circuit is connected to the operand storage circuits and the operating circuits, and is configured to selectively generate the load commands to load selected operands. Power is conserved by loading only the selected operands.

11 Claims, 4 Drawing Sheets

| Operating Circuit | Operand A | Operand B |
|---|---|---|
| ALU | R1 | R2 |
| Multiplier | R3 | R4 |
| Other | R2 | R3 |
| ⋮ | ⋮ | ⋮ |

FIG. 4

| Operating Circuit | Operand A | Operand B |
|---|---|---|
| ALU | R1 | R3 |

FIG. 5

MICROPROCESSOR CORE POWER REDUCTION BY NOT RELOADING EXISTING OPERANDS

BACKGROUND OF THE INVENTION

1. Field of the Invention

The present invention relates to microprocessor cores. In particular, the invention relates to reducing power consumption in a microprocessor core by not reloading operands into the core's data-path if they do not change.

2. Description of the Related Art

In a microprocessor, the core performs the function of processing data into desired results. FIG. 1 illustrates an exemplary core 100 in a reduced instruction set computer (RISC) architecture, for example, the CR16A Compact RISC architecture from National Semiconductor Corp., Santa Clara, Calif. Core 100 includes data bus 110, operand storage circuits 120, control unit 130, load command lines 140, operating circuits 150, selection circuit 160, select signal lines 170, data path input lines 180, and result signal lines 190.

Data bus 110 transmits data to be processed by core 100. Operand storage circuits 120 store operands transmitted by the bus for processing by operating circuits 150. Control unit 130 generates load commands on load command lines 140 that instruct operand storage circuits 120 to load the operands from data bus 110. During a clock cycle, data bus 110 transmits a first operand and a second operand, and control unit 130 instructs operand storage circuit 121 to store the first operand and operand storage circuit 122 to store the second operand.

The first and second operands are provided to operating circuits 150 on data path input lines 180. General types of operating circuits include an arithmetic and logic unit circuit (ALU) 152, a multiplier circuit 154, and a third operating circuit 156, among other circuits. Result signal lines 190 transmit the processing results to selection circuit 160. Control circuit 130 sends a select signal on select signal lines 170 to select a selected result from operating circuits 150. The selected result is transmitted on result signal line 199.

A concern is the power consumed by the core. This is significant for portable devices. One reference has set forth the relationship as follows:

$$P=CV^2F$$

where P is the power consumed by the core, C is the capacitance of the core logic elements, V is the voltage supplied to the core, and F is the frequency of the core operating circuits. The above equation has suggested a number of solutions to the power consumption problem.

One solution is to reduce the voltage. This has the benefit of quadratically reducing the power consumption. Consequently, a number of portable microprocessors today operate at 3.3 volts, whereas non-portable microprocessors generally operate at 5 volts.

Another solution is to shut down completely the microprocessor when it is not needed, and to restart it when necessary.

Still another solution is to lower the clock frequency of the microprocessor. A microprocessor is not fully occupied with data processing all the time, and during times of light processing loads the frequency can be reduced with no perceived reduction in throughput.

However, even by implementing all the above solutions, there is still a need to further reduce the power consumed by a microprocessor.

SUMMARY OF THE INVENTION

The present invention addresses these and other problems of the prior art by providing an apparatus for and method of reducing the power consumed by a microprocessor core. The apparatus and method reduce power by not loading operands into the core's data path when they are already there.

According to one embodiment, an apparatus according to the present invention has a core circuit for implementing a microprocessor core, the core circuit including at least one data bus, a plurality of operand storage circuits, at least one operating circuit, and a control circuit. The data buses are configured to transmit a plurality of operands. The operand storage circuits are connected to the data buses, are configured to receive a plurality of load commands and in accordance therewith to load the operands, and are configured to output the operands. The operating circuits are connected to the operand storage circuits and are configured to receive the operands and in accordance therewith to generate a result signal. The control circuit is connected to the operand storage circuits and the operating circuits, and is configured to selectively generate the load commands to load selected operands. Power is conserved by loading only the selected operands.

According to another embodiment, a method according to the present invention reduces the power consumed by a microprocessor core. The method includes the steps of storing a plurality of current operands, comparing a next processing command with one or more stored processing commands, selectively replacing one or more current operands with one or more next operands, as indicated in the step of comparing. The method further includes the step of processing, according to the next processing command, the next operands and the current operands remaining after the step of selectively replacing, to generate a result signal. Power is conserved by replacing only the selected operands.

DETAILED DESCRIPTION OF THE PREFERRED EMBODIMENTS

Figure 1:
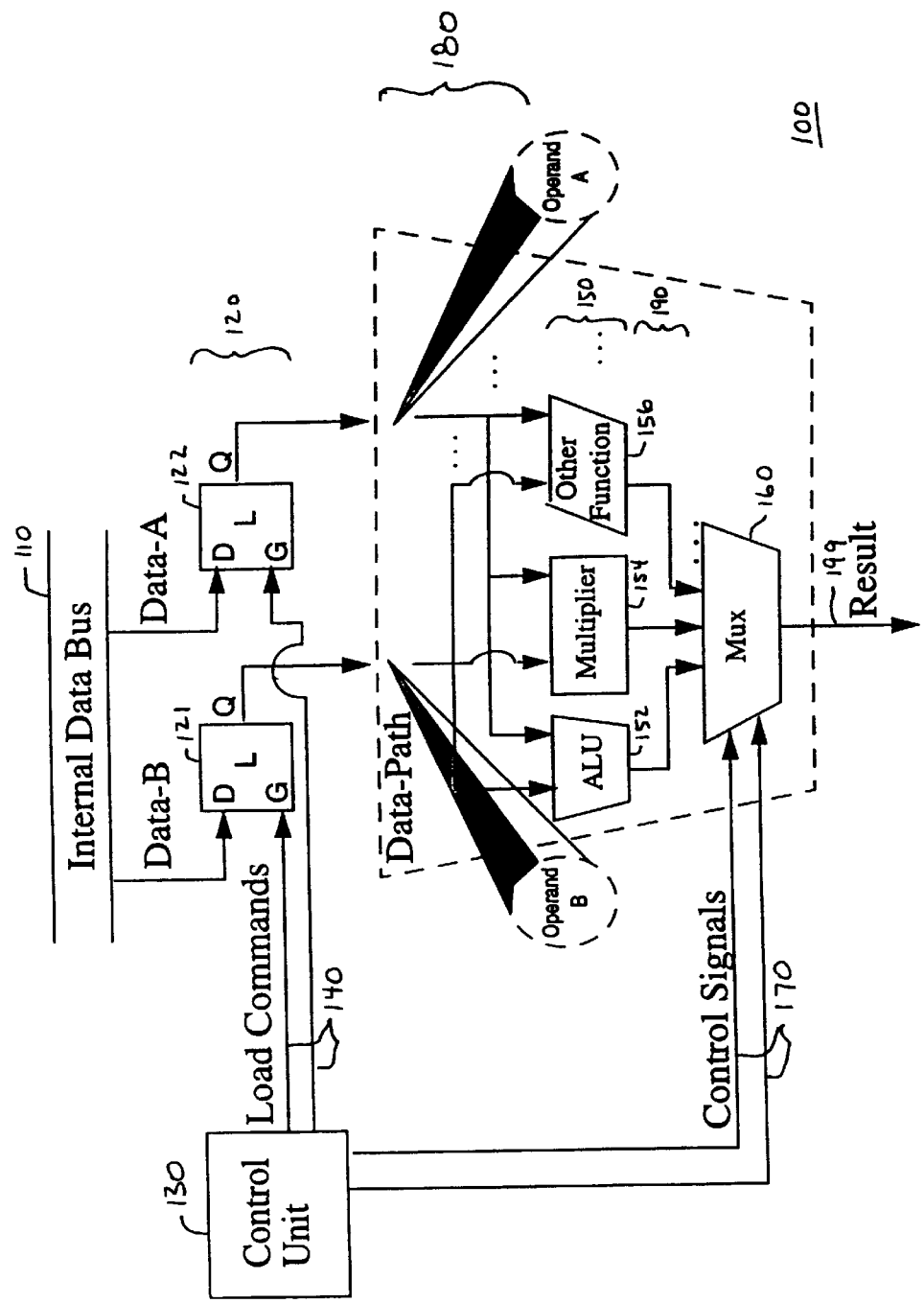
FIG. 1 is a block diagram of a prior art implementation of a microprocessor core.
Figure 2:
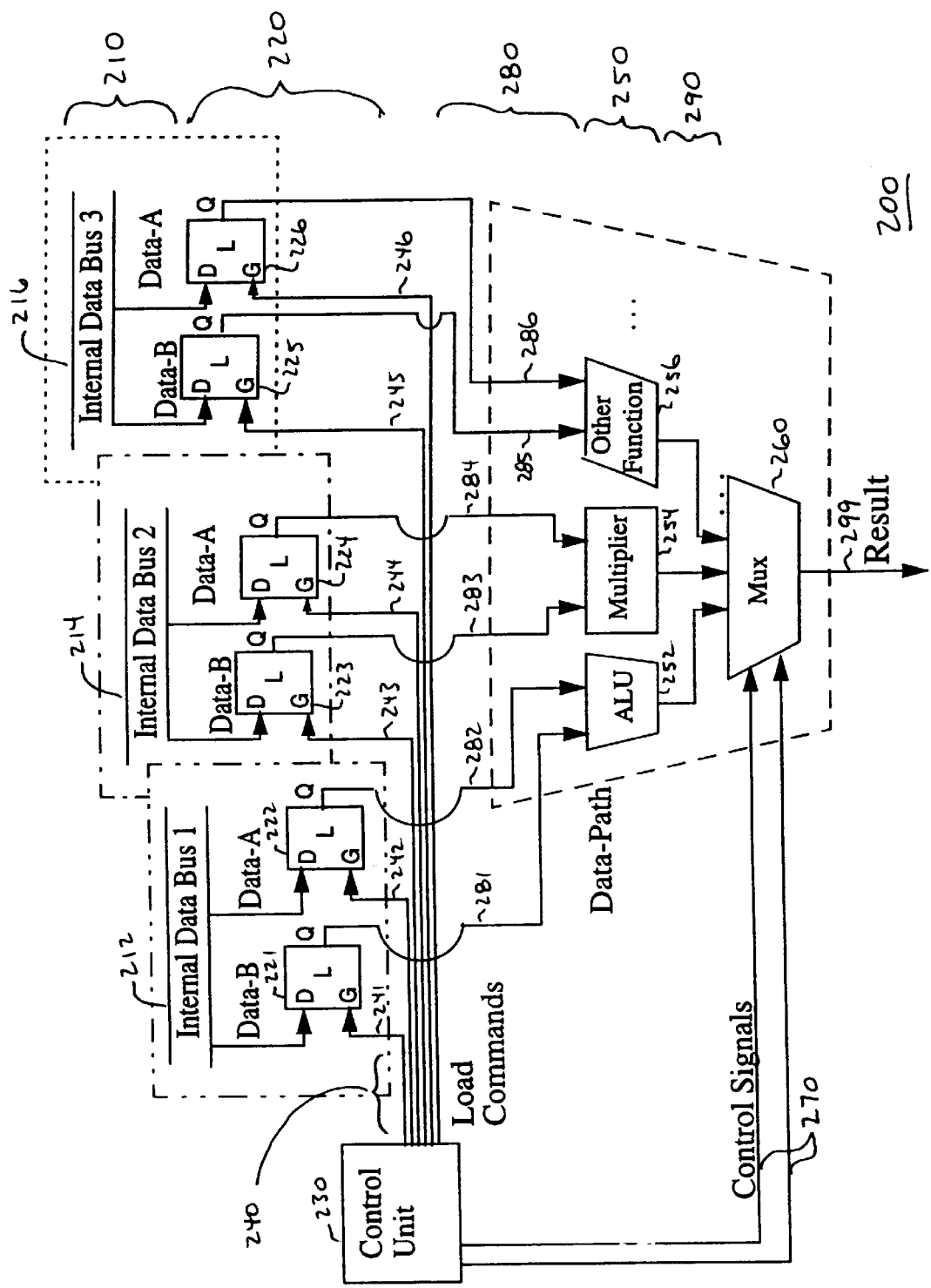
FIG. 2 is a block diagram of a microprocessor core according to one embodiment of the present invention.

FIG. 2 illustrates an exemplary core 200 according to the present invention. In one embodiment, core 200 is implemented as part of a CR16B Compact RISC architecture from National Semiconductor Corp. Core 200 includes data buses 210, operand storage circuits 220, control unit 230, load command lines 240, operating circuits 250, selection circuit 260, select signal lines 270, data path input lines 280, and result signal lines 290. These components operate in a manner consistent with the foregoing discussion, except as discussed below.

One distinguishing feature is that of at least one data bus. Data buses 210 include first data bus 212, second data bus 214, and third data bus 216. These buses' width is generally a power of two bits, usually 16, 32 or 64 bits.

Another distinguishing feature is that of operand storage circuits for each data bus. Operand storage circuits 220 include operand storage circuits 221 and 222 associated with first data bus 212, operand storage circuits 223 and 224 associated with second data bus 214, and operand storage circuits 225 and 226 associated with third data bus 216. Each operand storage circuit stores one operand, which is usually the same size as the data bus.

Yet another distinguishing feature is that of the operand storage circuits being dedicated to each operating circuit, instead of sharing the operand storage circuits among the operating circuits. Of operating circuits 250, ALU 252 is associated with operand storage circuits 221 and 222. Multiplier 254 is associated with operand storage circuits 223 and 224. Third operating circuit 256 is associated with operand storage circuits 225 and 226. This allows each operating circuit to process its own operands.

Still another distinguishing feature is data path input lines connecting one operand storage circuit to one operating circuit, instead of connecting one operand storage circuit to every operating circuit. Of data path input lines 280, line 281 connects operand storage circuit 221 and line 282 connects operand storage circuit 222 with ALU 252. Line 283 connects operand storage circuit 223 and line 284 connects operand storage circuit 224 with multiplier 254. Line 285 connects operand storage circuit 225 and line 286 connects operand storage circuit 226 with third operating circuit 256.

A further distinguishing feature is having the control unit issue load commands to account for the multiple operand storage circuits. Control unit 230 issues load commands to operand storage circuit 221 on line 241, to operand storage circuit 222 on line 242, to operand storage circuit 223 on line 243, to operand storage circuit 224 on line 244, to operand storage circuit 225 on line 245, and to operand storage circuit 226 on line 246.

These features enable core 200 to conserve power by loading only those operands that change for a given operating circuit. In core 100, the operands are loaded each cycle before they are processed. Each such loading uses power as a result of charging and discharging the capacitive loads in operand storage circuits 120.

In contrast, control unit 230 issues the load commands to take advantage of the temporal proximity of the operands used by each operating circuit 250. If an operand is already present in any of the operand storage circuits 220, it is not reloaded. By not reloading, power is conserved.

Figure 3:
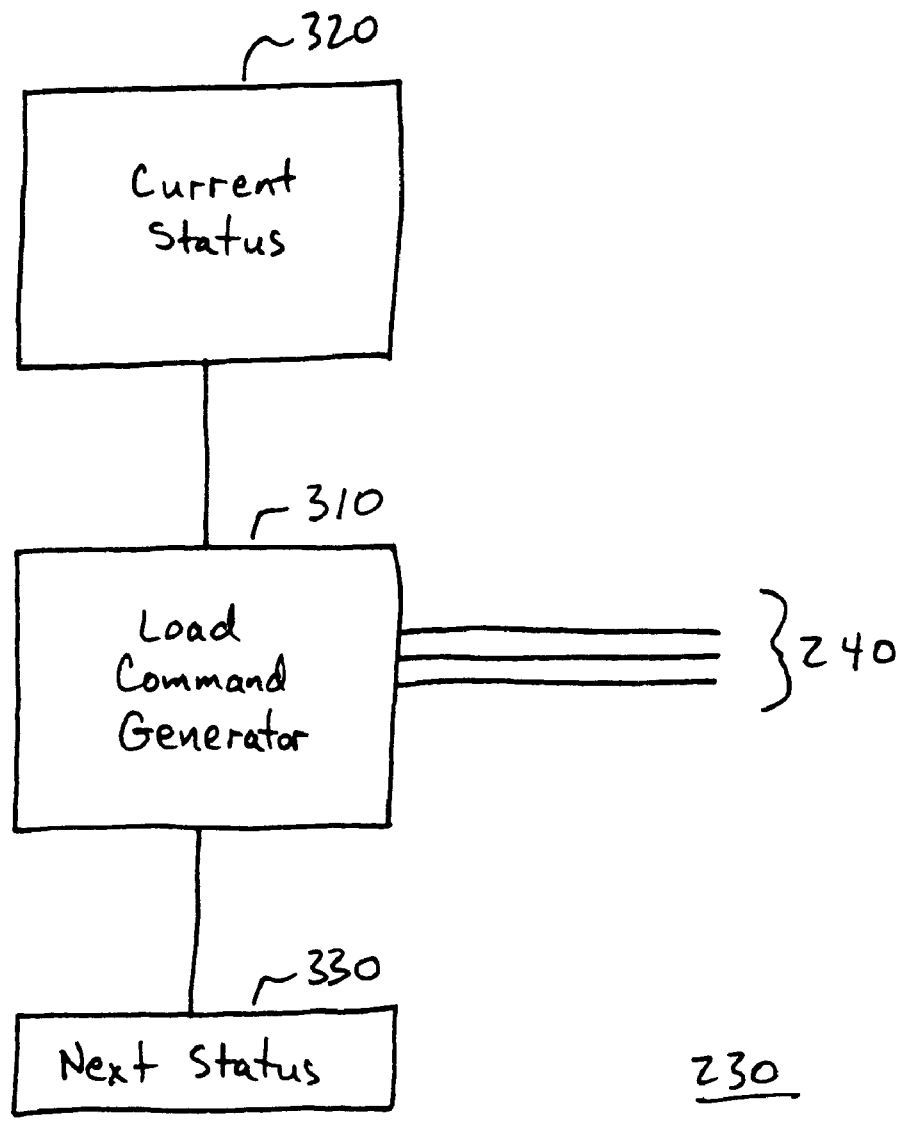
FIG. 3 is a block diagram of the control unit in the microprocessor core of FIG. 2.
Figure 1:
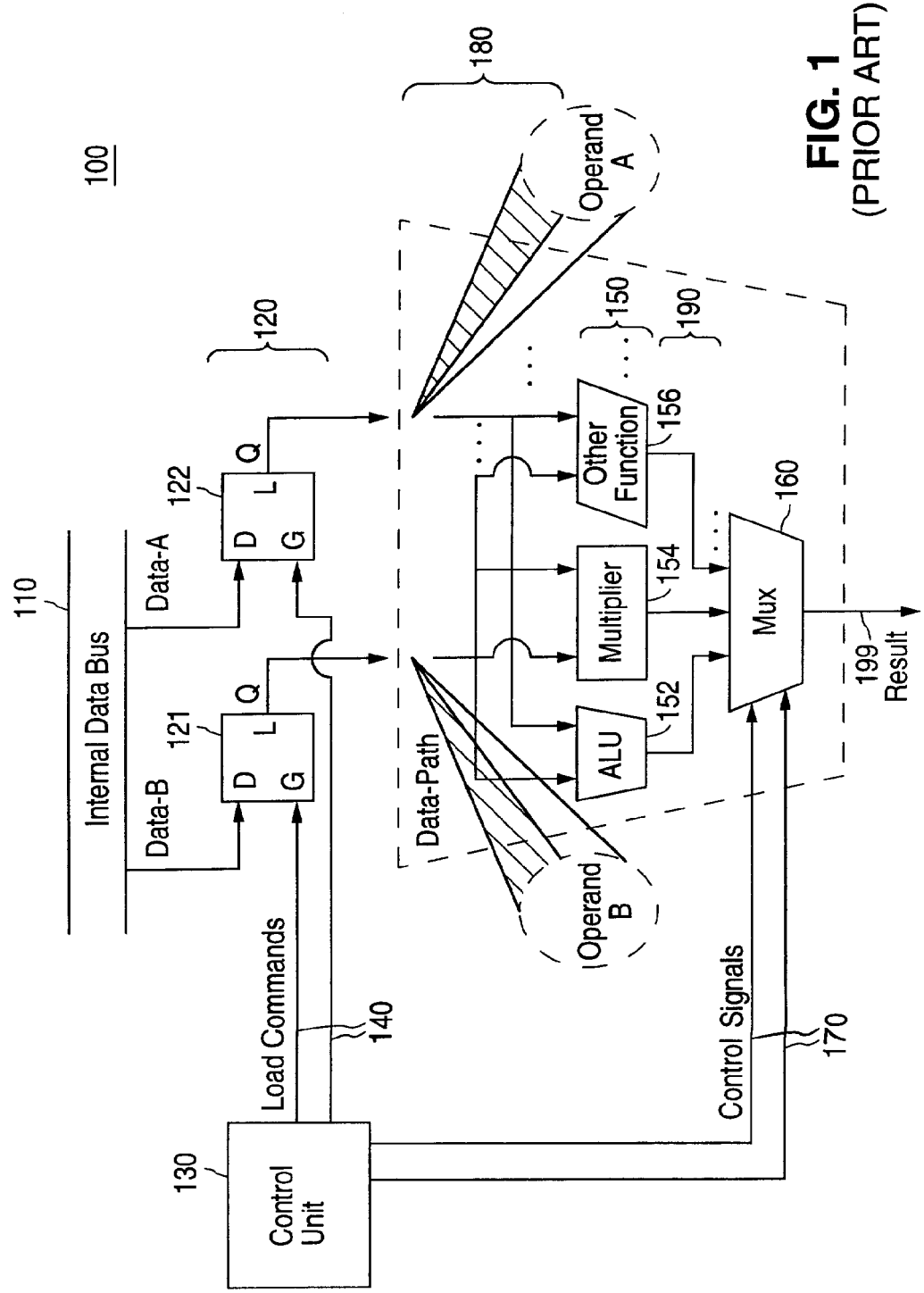
Figure 2:
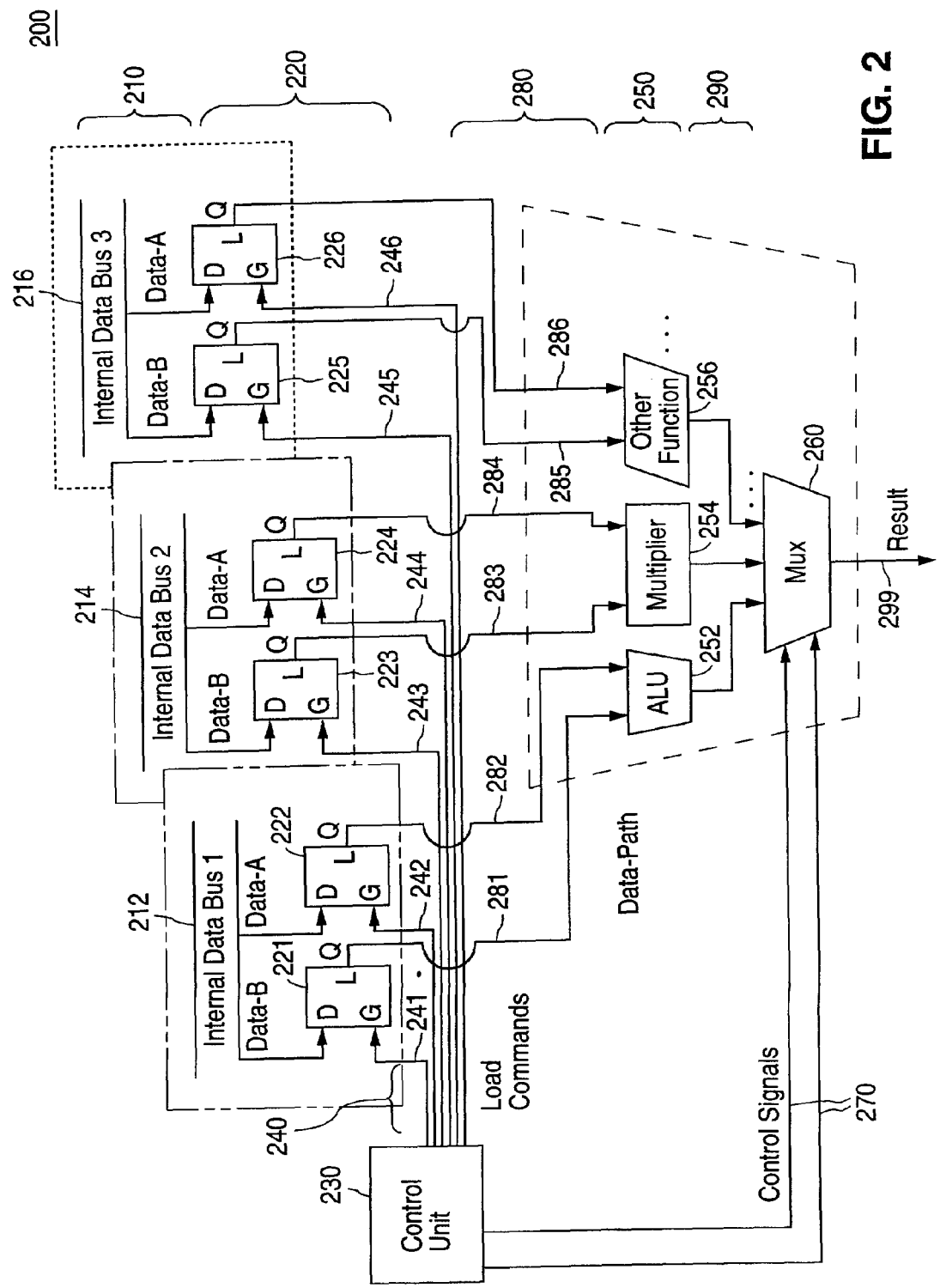

FIG. 3 shows the components that comprise control unit 230, including a load command generator circuit 310, a current status storage circuit 320, and a next status operand storage circuit 330. Current status storage circuit 320 stores current status information on the operands currently stored in operand storage circuits 220. Next status storage circuit 330 stores next status information on the operands to be next stored in operand storage circuits 220. Load command generator circuit 310 compares the current status information and the next status information, and generates load commands to only those operand storage circuits whose operands differ. Load command generator 310 may also add the next status information to the current status information after this comparison, so that this information is reflected for the next comparison.

Figures 3, 4, 5:
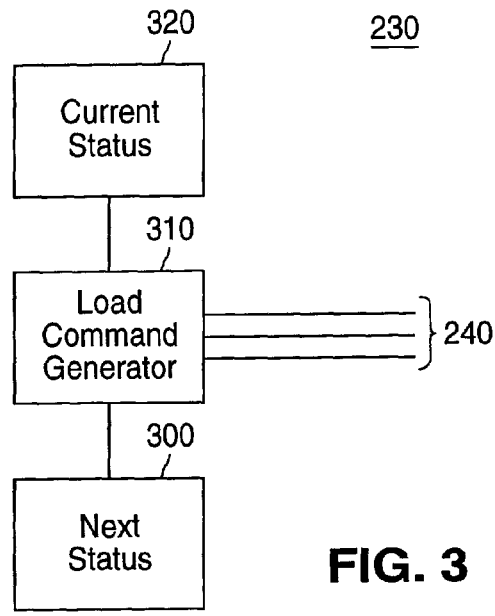
FIG. 4 is a data diagram of current status information stored in the microprocessor core of FIG. 2.
FIG. 5 is a data diagram of next status information stored in the microprocessor core of FIG. 2.

FIG. 4 shows some of the data stored as the current status information in storage circuit 320. FIG. 4 reflects that each operating circuit 250 shown in FIG. 2 has its own two operand storage circuits 220. For each operating circuit, the operands currently stored in the operand storage circuits are listed. For example, for ALU 252, the operands RI and R2 are stored.

FIG. 5 shows some of the next status information in storage circuit 330. This next status information may include a command to be processed by core 200. Such a command may include information on an operation to be performed and the operands on which to operate. Such a command may be an entire instruction, or may be one of a number of micro-operations that make up an instruction.

For example, an operation is to be performed by ALU 252 on R1 and R3. As shown in FIG. 4, the operand storage circuits for ALU 252 already have stored R1. In such a case, load command generator circuit 310 generates a load command for only one of operand storage circuits 220, to replace R2 with R3.

Thus, for the two ALU operations, core 200 performed three operand loads- The same two ALU operations by core 100 involve four operand loads. Assuming the same data path width and gate microstructure for the ALUs in both cores 100 and 200, core 200 improves the power consumption of the second ALU operation by 50%, and of both ALU operations by 25%.

Load command generator circuit 310 may also update the current status information to reflect R1 and R3 for ALU 252.

Although FIG. 2 shows one data bus and two operand storage circuits for each operating circuit, other relationships are possible. For example, two operating circuits could receive operands from the same data bus and operand storage circuits. As a further example, an operating circuit could process three operands, in which case it may have three associated operand storage circuits.

As yet another example, each operating circuit could have its own operand storage circuits, but the operand storage circuits could be loaded from the same data bus. However, such an arrangement would reduce the ability of the core to load the operand storage circuits concurrently. Having more than one bus also allows more efficient pipelining of commands.

Although the description has been made with reference to a RISC microprocessor, the principles of the present invention can be applied to non-RISC implementations as well.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus including a core circuit for implementing a microprocessor core with reduced power consumption, said core circuit comprising:

plurality of data buses, configured to transmit a plurality of operands;

a plurality of operand storage circuits, coupled to said plurality of data buses, said plurality of operand storage circuits configured to receive a plurality of sets of load commands and in accordance therewith load selected ones of said plurality of operands, and configured to output said loaded plurality of operands;

a plurality of operating circuits, coupled to said plurality of operand storage circuits, said plurality of operating circuits configured to receive said plurality of operands and in accordance therewith generate a plurality of result signals, wherein each set of said plurality of sets of load commands is associated with one of said plurality of operating circuits; and a control circuit, coupled to said plurality of operand storage circuits and said plurality of operating circuits, said control circuit configured to selectively generate said plurality of sets of load commands, wherein said selected ones of said plurality of operands comprise operands not previously stored in said plurality of operand storage circuits, wherein power is conserved by loading only said selected ones of said plurality of operands.

2. The apparatus of claim 1, wherein said control circuit is further configured to generate a select signal, and further wherein said core circuit further comprises:

a selection circuit, coupled to said control circuit and said plurality of operating circuits, configured to receive said plurality of result signals and said select signal, and to generate a selected result signal as indicated by said select signal.

3. The apparatus of claim 1, wherein a quantity of said plurality of data buses corresponds to a quantity of said plurality of operating circuits.

4. The apparatus of claim 1, wherein each of said plurality of data buses is associated with at least one of said plurality of operand storage circuits.

5. The apparatus of claim 1, wherein each one of said plurality of operating circuits is associated with at least one of said plurality of operand storage circuits.

6. The apparatus of claim 1, wherein each one of said plurality of operating circuits is associated with one of said plurality of data buses and at least one of said plurality of operand storage circuits.

7. The apparatus of claim 6, wherein:

said associated data bus transmits a subset of said plurality of operands to be processed by said associated operating circuit; and said associated at least one operand storage circuit stores said subset of said plurality of operands.

8. The apparatus of claim 1, wherein said control circuit comprises:

a first storage circuit to store current status information;

a second storage circuit to store next status information; and a load command generation circuit, coupled to said first storage circuit and said second storage circuit, said load command generation circuit configured to selectively generate said plurality of sets of load commands based on said current status information and said next status information.

9. The apparatus of claim 8, and wherein said control circuit is further configured to generate a select signal, and further wherein said control circuit further comprises:

a select signal generator circuit, coupled to said second storage circuit, said select signal generator circuit configured to selectively generate said select signal based on said next status information.

10. The apparatus of claim 8, wherein said load command generation circuit generates a load command to a designated one of said plurality of operand storage circuits when said next status information indicates a next operand that is different than a current operand as indicated by said current status information for said designated one of said plurality of operand storage circuits.

11. The apparatus of claim 8, wherein:

said current status information comprises information identifying current ones of said plurality of operands and information identifying a current one of said plurality of operating circuits; and said next status information comprises information identifying next ones of said plurality of operands and information identifying a next one of said plurality of operating circuits.

* * * * *

UNITED STATES PATENT AND TRADEMARK OFFICE
CERTIFICATE OF CORRECTION

PATENT NO. : 6,345,363 B1
DATED : February 5, 2002
INVENTOR(S) : Limor Levy-Kendler It is certified that error appears in the above-identified patent and that said Letters Patent is hereby corrected as shown below:

Title page,
The title page, showing the illustrative figure, should be deleted and substitute therefore the attached title page.
At [*] Notice: please delete "This patent is subject to a terminal disclaimer."
After the ABSTRACT, "4 Drawing Sheets" should read -- 3 Drawing Sheets --.

Drawings,
The drawing sheets, consisting of Figs. 1-5, should be deleted to be replaced with the drawing sheets, consisting of Figs. 1-5, as shown on the attached page.

Column 4,
Line 51, before "plurality of data buses," insert -- a --.

Signed and Sealed this

Twenty-third Day of July, 2002

Attest:

Attesting Officer

JAMES E. ROGAN
Director of the United States Patent and Trademark Office

(12) United States Patent
Levy-Kendler

(10) Patent No.: US 6,345,363 B1
(45) Date of Patent: *Feb. 5, 2002

(54) MICROPROCESSOR CORE POWER REDUCTION BY NOT RELOADING EXISTING OPERANDS

(75) Inventor: Limor Levy-Kendler, Kadima (IL)

(73) Assignee: National Semiconductor Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/102,690

(22) Filed: Jun. 23, 1998

(51) Int. Cl.[7] .................................................. G06F 1/32
(52) U.S. Cl. .......................................... 713/320; 712/33
(58) Field of Search .................... 712/33, 11; 713/300, 713/320, 322, 323, 324, 330, 340

(56) References Cited

U.S. PATENT DOCUMENTS

| | | | |
|---|---|---|---|
| 4,870,570 A | 9/1989 | Satoh et al. | 364/200 |
| 4,893,271 A | 1/1990 | Davis et al. | 364/900 |
| 5,025,387 A | 6/1991 | Frane | 364/493 |
| 5,036,456 A | 7/1991 | Koegel | 364/200 |
| 5,218,704 A | 6/1993 | Watts, Jr. et al. | 395/750 |
| 5,369,771 A | 11/1994 | Gettel | 395/750 |
| 5,390,350 A | 2/1995 | Chung et al. | 395/150 |
| 5,392,023 A | 2/1995 | D'Avello et al. | 358/400 |
| 5,396,635 A | 3/1995 | Fung | 395/800 |
| 5,408,668 A | 4/1995 | Tornai | 395/750 |
| 5,418,969 A | 5/1995 | Matsuzaki et al. | 395/750 |
| 5,428,790 A | 6/1995 | Harper et al. | 395/750 |
| 5,485,116 A | 1/1996 | Cserveny et al. | 327/537 |
| 5,511,203 A | 4/1996 | Wisor et al. | 395/750 |
| 5,513,175 A | 4/1996 | Ichii et al. | 370/17 |
| 5,692,202 A | 11/1997 | Kardach et al. | 395/750 |
| 5,880,981 A * | 3/1999 | Kojima et al. | 708/523 |
| 6,092,094 A * | 7/2000 | Ireton | 708/706 |

OTHER PUBLICATIONS

National Semiconductor, CR32A Programmer's Reference manual, Feb. 97, pp. 5–1, 5–2, 5–20–5–21, 5–32–5–33.*

Case, Brian "Piranha Family Will Scale From Eight To Sixty–Four Bits", 1994 MicroDesign Resources; vol. 8, Nov. 15, Nov. 14, 1994; pp. 1–4.

* cited by examiner

*Primary Examiner*—John F. Niebling
*Assistant Examiner*—Stacy Whitmore
(74) *Attorney, Agent, or Firm*—Pillsbury Winthrop LLP

(57) ABSTRACT

An apparatus for and method of reducing the power consumed by a microprocessor core are disclosed. The apparatus and method reduce power by not loading operands into the core's data-path when they are already there. The apparatus has a core circuit for implementing a microprocessor core, the core circuit including at least one data bus, a plurality of operand storage circuits, at least one operating circuit, and a control circuit. The data buses are configured to transmit a plurality of operands. The operand storage circuits are connected to the data buses, are configured to receive a plurality of load commands and in accordance therewith to load the operands, and are configured to output the operands. The operating circuits are connected to the operand storage circuits and are configured to receive the operands and in accordance therewith to generate a result signal. The control circuit is connected to the operand storage circuits and the operating circuits, and is configured to selectively generate the load commands to load selected operands. Power is conserved by loading only the selected operands.

11 Claims, 4 Drawing Sheets

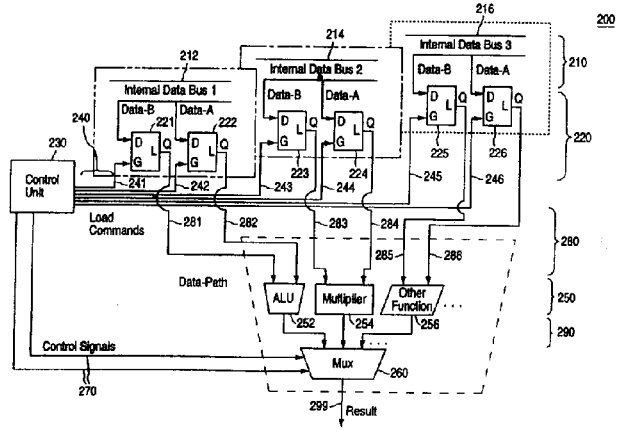

| Operating Circuit | Operand A | Operand B |
|---|---|---|
| ALU | R1 | R2 |
| Multiplier | R3 | R4 |
| Other | R2 | R3 |
| ⋮ | ⋮ | ⋮ |

| Operating Circuit | Operand A | Operand B |
|---|---|---|
| ALU | R1 | R3 |